M. CORNINE.
TESTING MACHINE.
APPLICATION FILED OCT. 2, 1908.

1,016,322.

Patented Feb. 6, 1912.

Witnesses
William K. Gilchrist
J. Whyard

Inventor
Marshall Cornine
By his Attorney
A. G. N. Vermilya

UNITED STATES PATENT OFFICE.

MARSHALL CORNINE, OF NEW YORK, N. Y.

TESTING-MACHINE.

1,016,322. Specification of Letters Patent. Patented Feb. 6, 1912.

Application filed October 2, 1908. Serial No. 455,931.

*To all whom it may concern:*

Be it known that I, MARSHALL CORNINE, a citizen of the United States, and a resident of Manhattan, New York, in the county of New York and State of New York, have invented certain new and useful Improvements in Testing-Machines, of which the following is a specification.

My invention relates to testing machines and particularly to machines for testing gas meters, and it consists: as one feature, in interposing an automatic trip in the intake passage; also in arranging for the ready setting of the meter and connecting it to the conduit from the fluid (gas) holder; also in the peculiar bell I employ in the measuring part of the apparatus; and in various details hereinafter described and claimed.

Gas meters, such as are generally employed, are well known and the details of their construction need not be specified.

In many, such as the well known "Hopper" meter, double bellows, holding given quantities, are inflated by the entry of gas and collapsed upon its passage to the burner connections. The wall or diaphragm of the bellows is geared to a rod, usually one on each side, and the movement of the bellows oscillates those rods, they in turn operate a train of wheels and one or more fingers which point, on one or more dials, to figures which indicate the quantity of gas that has passed through the meter.

I do not limit my invention to use with such meters, but I have shown it in connection with one of that class.

Figure 1:
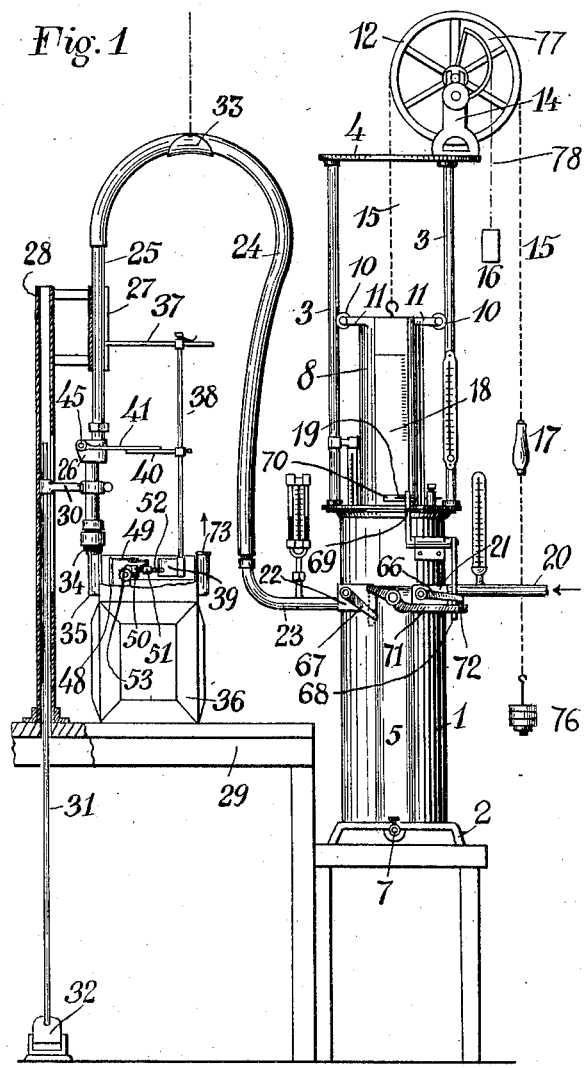
Figure 2:
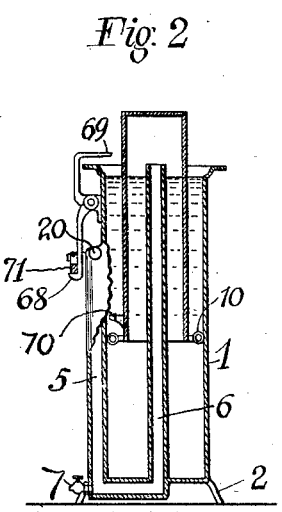
Figures 3, 4, 5:
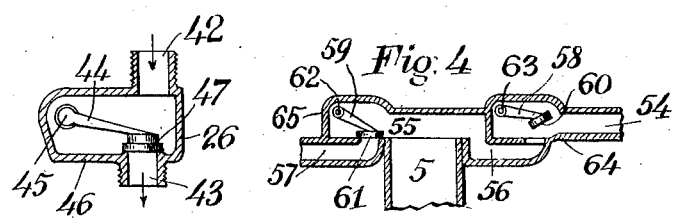
Figure 6:
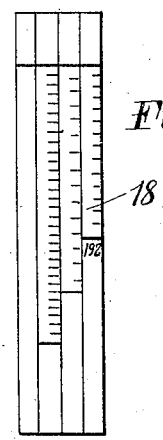

In the drawings, Figure 1, is a front elevation, partly in section, of a testing machine embodying my invention, shown as it is placed to be operated in testing a meter such as is represented upon the table of the drawing. Fig. 2, is a vertical sectional view of the bell of the device and its holder and pipe connections. Fig. 3, is an enlarged view of one form of valve which I may employ. Fig. 4, is a detail view, partly in section, of two of the trip valves shown in Fig. 1. Fig. 5, is a side view of another pair of valves which I may use in place of those last shown. Fig. 6, represents the multiple scale which is preferably mounted upon the bell.

The method of testing such meters is as follows: The intake of the meter is connected with a measuring device which holds or can hold a quantity of gaseous matter, usually air and that in turn is connected to a source of supply. A given quantity of gas is passed through the meter and the indicator is read. If it indicates that the given quantity has passed, then it is correctly adjusted. If it does not, then adjustment is needed.

In the form shown, 1, is an open top cylinder, mounted on supports 2, and adapted to be set upon a table or bench as shown.

At the upper end it has a series of guide rods 3, connected at the top by a bar 4, for strength. A tube 5, extends down the front of this cylinder to a point preferably below its bottom, then into and upward, at 6, within it to a point usually somewhat above its outer level. At the bottom, it is provided with a drip cock 7, to draw off any water which may get into it.

8, is the bell, a cylinder closed at one end and provided with guide rollers 9, 10, mounted in extensions 11, in such manner that some of them 10, make contact with and roll along the inner face of the cylinder 1, while others 9, make contact with and roll upon the guide rods 3.

A wheel 12, is mounted in a bracket 14, at the top of the device, and a cord 15, extends partly around it and is secured to the bell 8, and provided with weights 76, and a hand pull 17, (if need be) on the outboard part, etc. I also sometimes mount a cam 77 on wheel 12 and suspend a weight 16 (for the main counterbalance) from a cord 78 passing over said cam and secured to its upper end.

A scale 18, here a multiple one, is secured to the face of the bell and an indicator 19, is mounted on the cylinder 1, to indicate on said scale, the quantity of gas in the bell. Pressure and other gages are provided also.

20, is the intake, leading from the open air or some other source of supply, as may be desired, to a trip valve 21, which, in turn, leads to the tube 5. At the other side of tube 5, an outlet valve 22, connects with a tube 23, 24, 25, the part 24 of which is preferably flexible and in part 25, I locate a trip valve 26.

The tube 25, passes through a hollow sleeve 27, mounted upon a hollow arm 28, rising from the table 29, which is arranged to furnish support to the meter to be tested, and said tube 25, is supported by an arm 30, extending from an arm or rod 31, which passes up through the arm 28, and is linked to a foot treadle 32, located upon the floor. The flexible part 24, of the tube, is usually supported by a hanger 33.

The lower end of tube 25, is provided with a felt or rubber gasket 34, adapted to fit upon and make a tight joint with the inlet 35, of the meter 36.

In an arm or support 37, extending out from sleeve 27, I mount an oscillating or oscillatory rod 38, which extends downward to the level of the meter indicating devices and is there provided with a cam or toe 39, while intermediate these points (as shown) it is provided with an arm 40, adapted to support the lever 41, of the valve 26, in tube 25. This valve 26, has an inlet port 42, an outlet port 43, an oscillatory arm 44, on a shaft 45, extending through the casing 46, and carrying lever 41, and a stopper 47, secured to arm 44, and adapted, when that is depressed, to rest upon and close the outlet port leading to the meter connection.

As already related, the meter has rods 48, (one shown) connected indirectly to its bellows, and from these rods, jointed levers 49, extend to and are pivoted upon a short shaft 50, which in turn is mounted on a sleeve 51, which is passed over the arm or tangent 52, mounted on a rotary shaft 53, which actuates the fingers of the indicators of the meter.

The valves 21, and 22, are substantially similar to valve 26, having inlets 54, and 55, outlets 56, and 57, levers 58, and 59, carrying stoppers 60, and 61, and secured to oscillatory shafts or arms 62, and 63, which extend through the casings 64, and 65, and are connected to outer levers 66, and 67.

On cylinder 1, I mount a swinging catch or trip 68, whose inner arm 69, is placed to register with a trip 70, set at any desired point on the face of bell 8, and said catch 68, in turn, supports a pivoted lever 71, mounted on the cylinder 1, and connected by a chain or link connection to lever 67. Lever 66 has a forked end 72, which registers with and at times rests upon the lever 71.

Now to test a meter, I proceed as follows: I place the meter on the table 29, press my foot upon the treadle 32, which raises tube 25, then push the meter back until its inlet tube 35, is immediately under the open end of tube 25, and release the treadle 32, whereupon the tube will come to rest upon intake 35, the gasket 34, making a tight joint therewith. Meanwhile the tube 8, had been already placed in cylinder 1, and its open end sealed by water in said cylinder, extending well up but not to the level of tube 6, the weights on cord 15, being preferably so adjusted as to about balance the said bell 8; now I open valve 21, by lifting arm 71, and supporting it on catch 68, and if the supply of air is at fifteen-tenths pressure, (which is the standard pressure for testing), it will cause the bell to rise in its bearings and when the proper gage mark reaches the finger 19, the supply is cut off, automatically if desired, because trip 70, having reached arm 69, will swing it upward and outward and catch 68, downward and inward from under lever 71, which, deprived of its support, will fall, thus permitting lever 66, to also fall and oscillate shaft 63, which in turn swings lever 58, downward and brings stopper 60, upon the port to the outlet and closes it. This having occurred, the lever 71, continues its downward movement and having reached the limit of the link connection with lever 67, the instant after valve 21, was closed, the further movement of lever 71, will raise arm 67, oscillate shaft 62, to raise lever 59, and stopper 61, thereby opening the passage for gas from tube 5, to tube 23, and thence to the meter. The valve 26, having been already opened by raising lever 41, and resting it on arm 40, in doing which the rod 38, was turned till the toe piece 39, rested against the rear side of the tangent 52, the gas passes from the bell through tubes 6, 5, valve 22, tubes 23, 24, 25, and valve 26, the inlet 35, to the meter, 36, through it and out at the outlet 73. If air is used, it may be allowed to escape into the atmosphere, but if illuminating gas is used, it will be led from outlet 73, to a suitable receptacle or burner. In its passage through the meter, the gas, as already described, caused the tangent to revolve and as one revolution is completed it strikes the toe piece 39, swings it and rod 38, about and thereby carries arm 40, from under arm 41, which thereupon drops and closes valve 26. No more gas can pass. Now I read the indicator on the meter. If its scale and the scale on bell 8, opposite finger 19, (which tells how much gas has passed out of bell 8,) agree, the meter is correct, if not, then the indicating mechanism of the meter is adjusted and another test is made.

I find that with the use of this machine, one man can, in one day test as many meters on one machine as six men were accustomed to test in one day with twelve of the devices formerly in use.

First, the time for setting and connecting the meter is very much shortened and rendered easier by the use of the treadle and the movable tube. Both hands of the operator are free for use in placing the meter and no turning up or down of screw-threaded unions is necessary.

Second, when one revolution of the tangent has taken place, it trips the valve and automatically shuts off the supply, which causes the results to be more exactly attained than was ordinarily possible when hand manipulation was required, as well as relieving the intensity of the strain upon the operator, which exists when his eye must see and his hand must move to accomplish the same result; and the same to some degree may be said of the rendering of valves 21, and 22, automatic.

If preferred, I may omit the valves 21, and 22, one or both, and use, in their places, ordinary stop cocks such as 74, and 75.

Various other changes may be made in the various instrumentalities which I employ to accomplish my purposes, without in any way departing from the spirit of the invention or stepping outside of the claims I make.

It will be noticed that the bell 8, is of different proportions from those of the bells of former devices, and those proportions will be found to be about 4 inches in diameter, by 16 inches in length, measuring, as the length, that part of the bell intended to hold the charge for one test; which charge in the instance of the particular bell shown, is 192 cubic inches. These proportions may be varied some, within the range of from 5¾ inches by 28 inches, to 4 inches by 40, inches, but are preferably of a diameter not less than one tenth nor greater than one fourth of its length.

The purpose of using such proportions is that the travel of the bell, for the quantity of gas used, may be sufficient to be readily measured upon gages or scales which can be read without effort or very close examination, and to also give movement enough to permit the operations required to take place without the variations which are likely to occur when other proportions are used, and at the same time, to avoid sizes which would in themselves be such as to permit variations impossible of ready detection, because of the elasticity of the gas.

I find that in rapid work, the inertia of the descending bell will carry it a little beyond its mark, at rest, and consequently if the device is balanced and there be not sufficient buoyancy to overcome the slight friction which would prevent a return to that mark, the indicator will not report truly. To prevent this result, I provide a head of gas above that which will be transferred in making the test; that is, I make the cylinder sufficiently long to leave a quantity of gas (about ten per cent. of that passed for the test) above the water line of the bell, when it has descended far enough to transfer a full test volume. The length of bell required to hold this surplus tenth and sufficient to extend down into the water so as to make a perfect seal, together with the length required to hold the testing charge, make up the required length of the bell, and the diameter should be such that the transfer of one per cent of the testing charge, will permit it to lower at least one-sixteenth of an inch. Other proportions work for inaccuracy or retardation, because of slow reading, or other delays, and without such head, as set forth, even my device, when gaged for testing meters delivering gas to flaming burners would not be perfect for testing meters exhausting into the open air.

It has been declared that no meter testing device of dimensions differing so greatly from the former ones, would be accurate and those of earlier form would not test quickly a small meter. But repeated and careful experiment has demonstrated that those discovered and above announced, are rapid and accurate in use.

What I claim and desire to secure by Letters-Patent, is:—

1. The combination of two fluid holders, a passage for the fluid leading from one fluid holder to the other, an index gage connected to the first holder, an index gage connected to the second holder, each indicating the quantity of fluid which has passed its respective holder, an automatic valve controlling the passage from one holder to the other and a valve trip connected with the valve and with a movable part of the fluid holder and adapted as described to operate said valve when one of said index gages has moved a given distance.

2. In a meter testing device, a movably suspended inlet tube, adapted to be connected to a source of supply and to the inlet of the meter, a platform adapted to support the meter, a treadle located below said platform and in a position easy of access to the foot of the tester and a supporting member connected to the inlet tube and extending below the platform and there connected to said treadle; whereby the adjustment of the said inlet tube to the height of the meter may be readily accomplished by foot power at the same time that its horizontal adjustment may be accomplished by hand power, all substantially as set forth.

3. In a meter testing machine, the combination of a fluid holding cylinder, containing a tube, a bell adapted to move up and down in said cylinder, an inlet pipe leading to said tube, an outlet pipe leading from said tube, valves adapted to control the passage of fluid through said pipes, an indicator adapted to mark the quantity of fluid within the bell, a movably suspended tube adapted to be connected to the inlet pipe of a meter, a connection between the said outlet from the cylinder tube and the said movable suspended tube, a member supporting some part of said tube, and a lifting device connected to said supporting member and adapted to raise the movable part of said suspended tube.

4. In a meter testing machine, the combination of a fluid holding cylinder containing a tube, a bell adapted to move up and down in said cylinder, an inlet pipe leading to said tube, an outlet pipe leading from said tube, valves adapted to control the passage of fluid through said pipes, an indicator adapted to mark the quantity of fluid within the bell, a movably suspended tube adapted to be connected to the inlet pipe of a meter, a connection between the said outlet from the cylinder tube and the said movable suspended tube, a member supporting some part of said tube, a lifting device connected to said supporting member and adapted to raise the movable part of the said suspended tube, an automatic valve controlling the passage to the meter and a trip adapted to be operated by the movable part of the meter, which trip in one position holds open the said automatic valve and in another position permits it to close.

5. In a meter testing machine, the combination of a fluid holding cylinder containing a tube, a bell adapted to move up and down in said cylinder, an inlet pipe leading to said tube, an outlet pipe leading from said tube, valves adapted to control the passage of fluid through said pipes, an indicator adapted to mark the quantity of fluid within the bell, a movably suspended tube adapted to be connected to the inlet pipe of a meter, a connection between the said outlet from the cylinder tube and the said movable suspended tube, a member supporting some part of said tube, a lifting device connected to said supporting member and adapted to raise the movable part of the said suspended tube, an automatic valve controlling the passage to the meter and a trip adapted to be operated by the meter indicating devices, which trip in one position holds open the said automatic valve and in another position permits it to close.

6. In a meter testing machine, the combination of a fluid holding cylinder containing a tube, a bell adapted to move up and down in said cylinder, an inlet pipe leading to said tube, an outlet pipe leading from said tube, valves adapted to control the passage of fluid through said pipes, an indicator adapted to mark the quantity of fluid within the bell, a tube adapted to be connected to the inlet pipe of a meter, a connection between the said outlet from the cylinder and the tube, adapted to be connected to the inlet pipe of a meter, an automatic valve controlling the passage to the meter and a trip adapted to be operated by the movable part of the meter, which trip in one position holds open the said automatic valve and in another position permits it to close.

Signed at New York in the county of New York and State of New York this 25th day of September A. D. 1908.

MARSHALL CORNINE.

Witnesses:
H. M. VERMILYA,
A. G. N. VERMILYA.

---

Copies of this patent may be obtained for five cents each, by addressing the "Commissioner of Patents, Washington, D. C."